No. 724,261. PATENTED MAR. 31, 1903.
C. S. COLE.
CONTROLLING MECHANISM FOR MOTORS.
APPLICATION FILED JUNE 14, 1900. RENEWED FEB. 9, 1903.
NO MODEL. 5 SHEETS—SHEET 1.
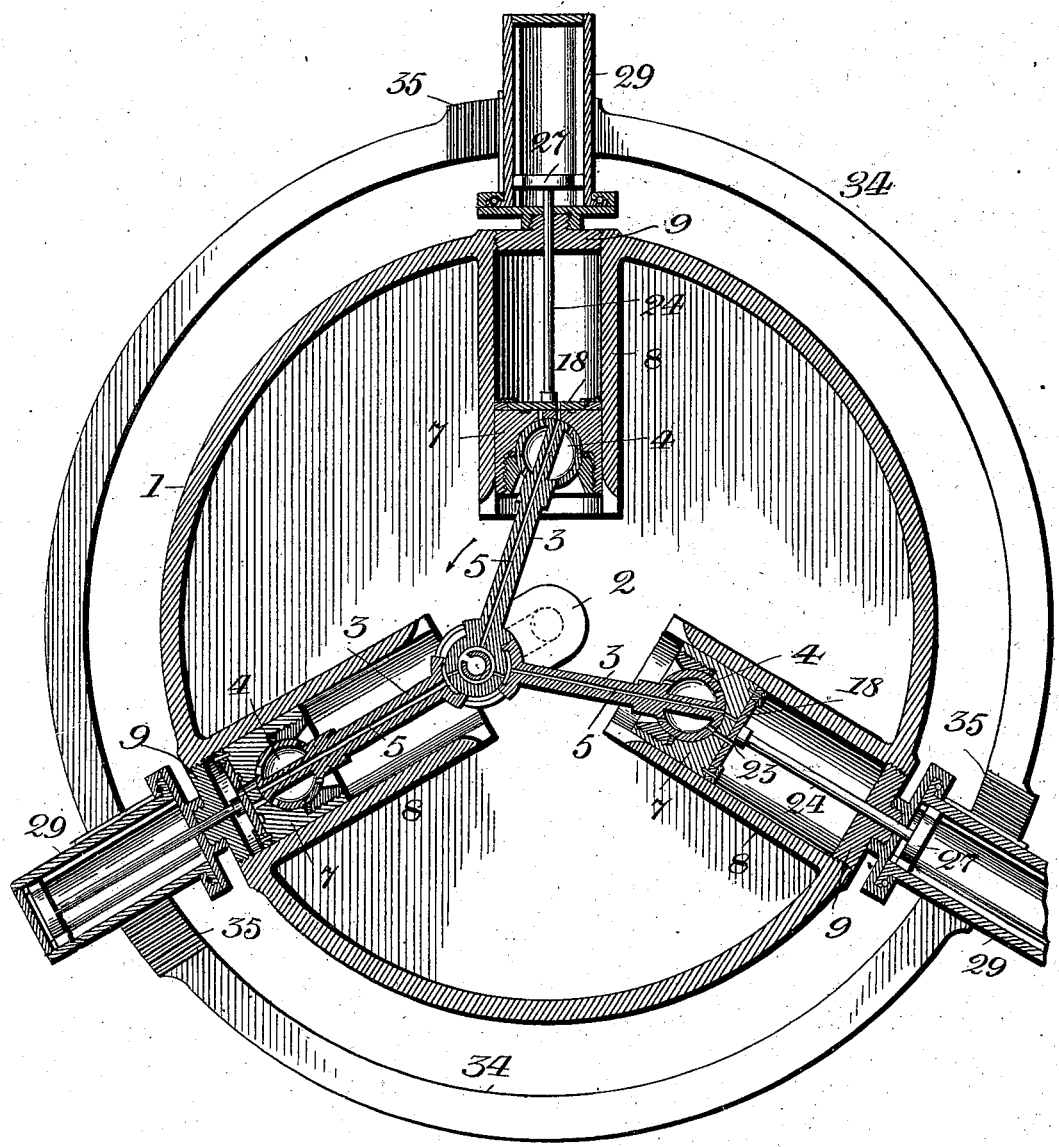
WITNESSES:
INVENTOR
Charles S. Cole
BY
Attorneys No. 724,261. PATENTED MAR. 31, 1903.
C. S. COLE.
CONTROLLING MECHANISM FOR MOTORS.
APPLICATION FILED JUNE 14, 1900. RENEWED FEB. 9, 1903.
NO MODEL. 5 SHEETS—SHEET 2.
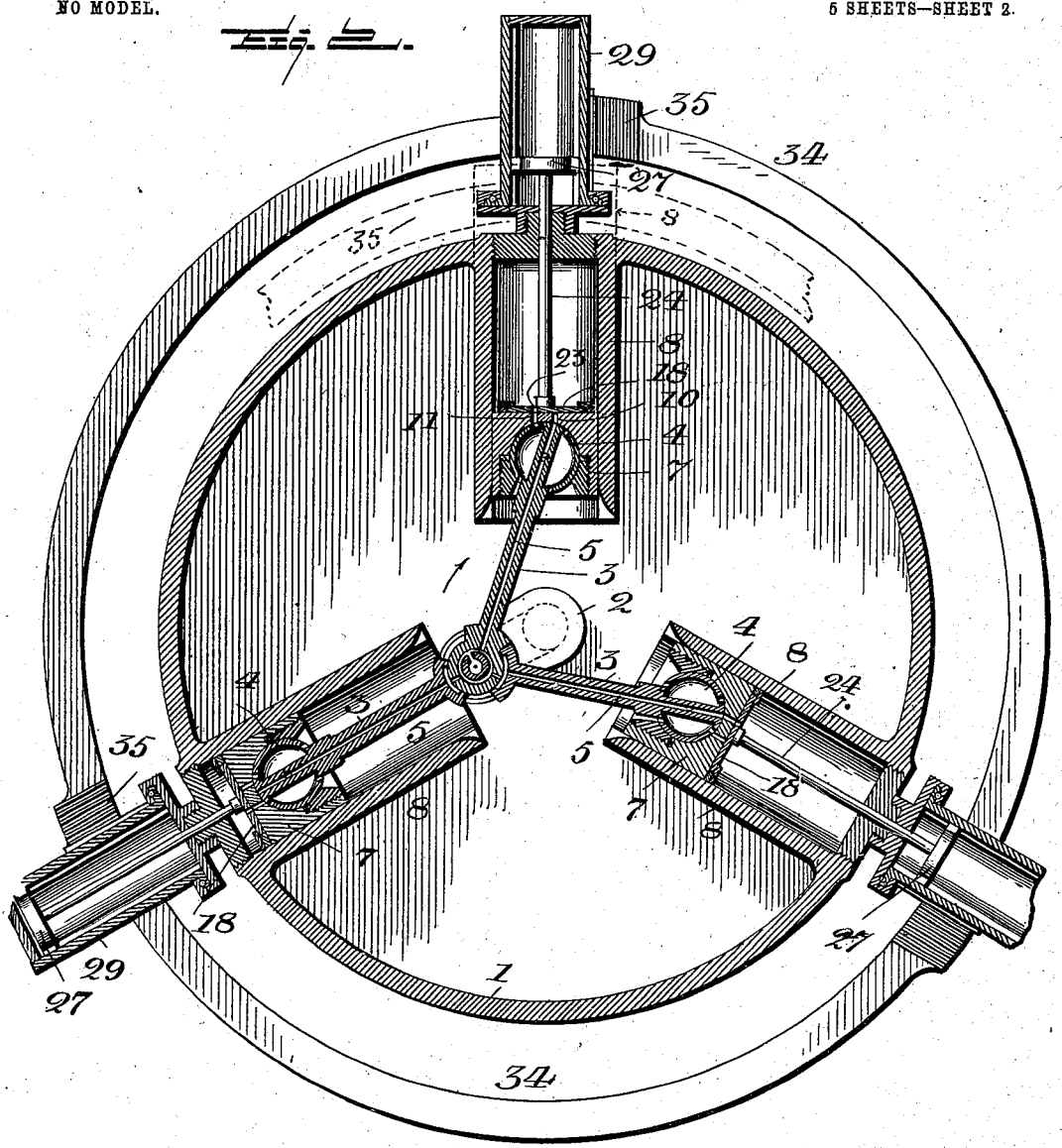
WITNESSES:
L. C. Hills
Karl H. Butler
INVENTOR.
Charles S. Cole
By X. Deane Son
Attorneys

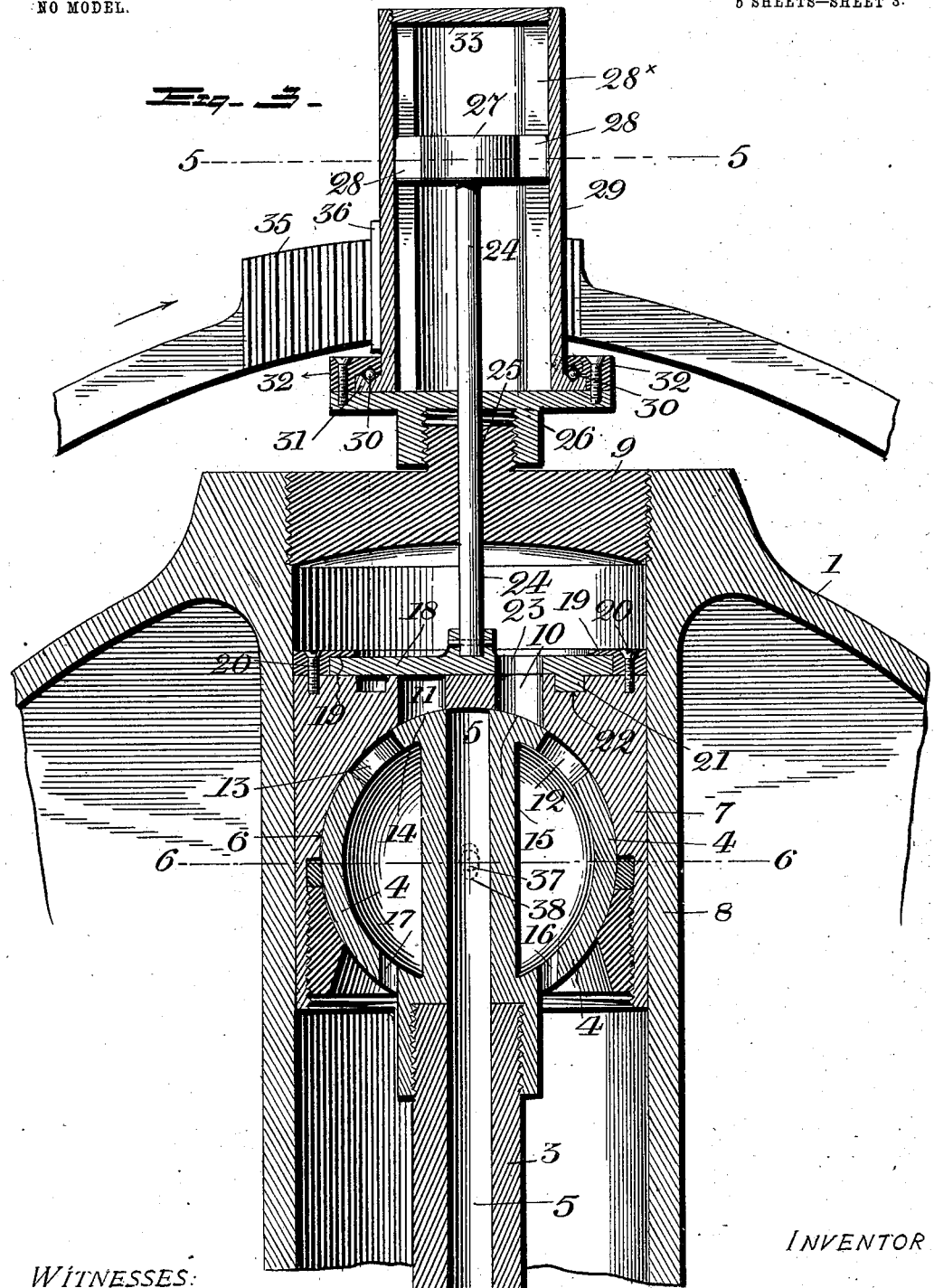

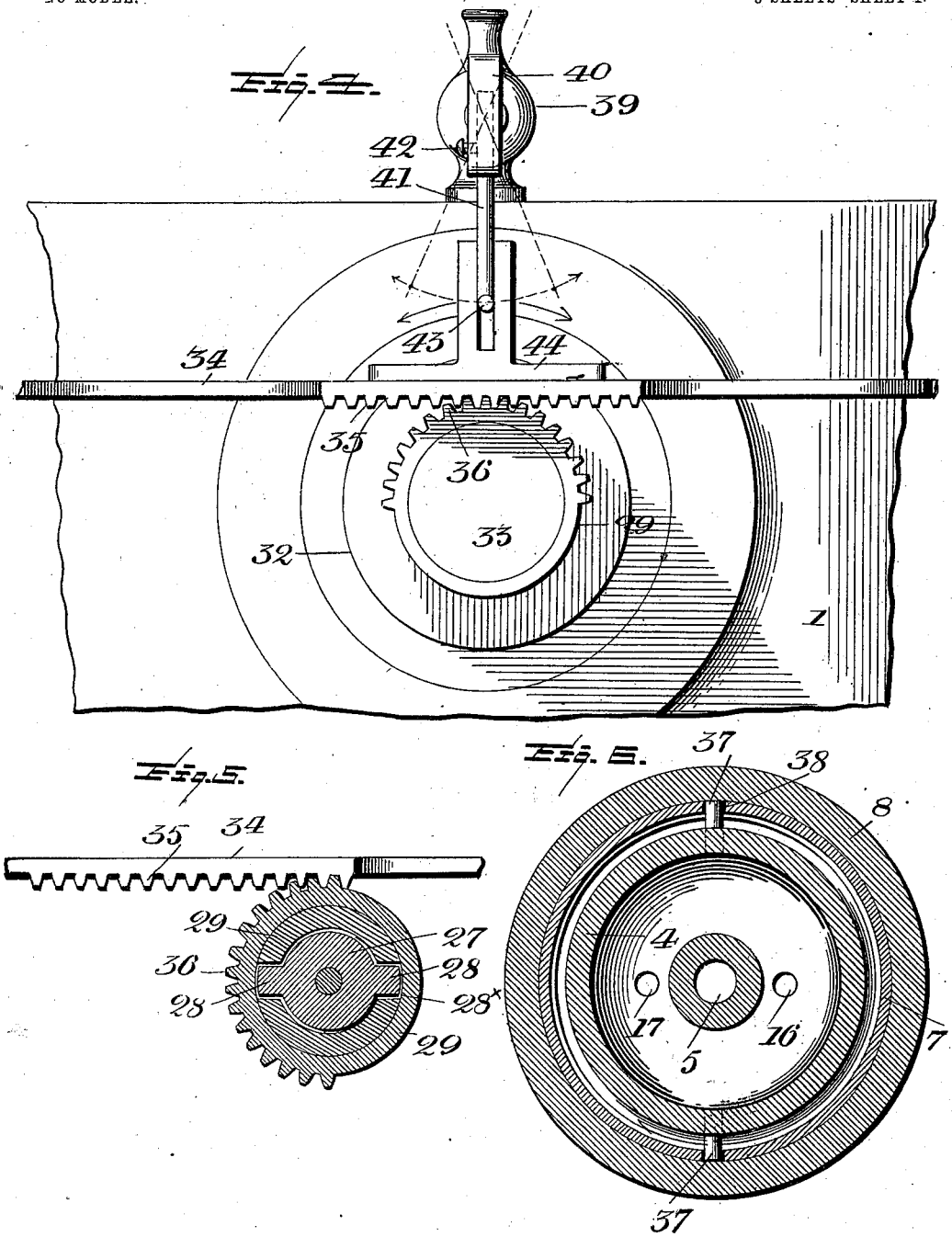

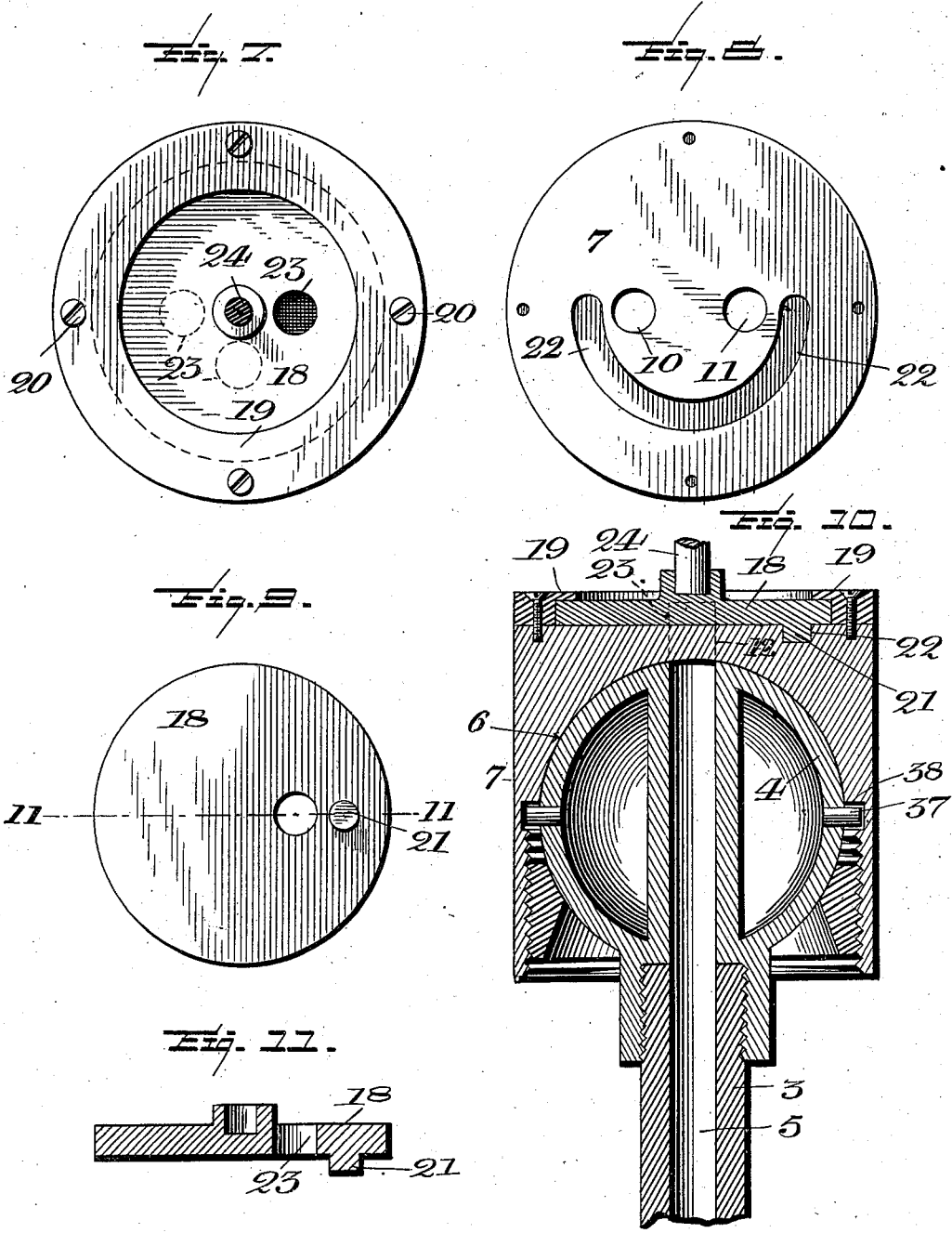

UNITED STATES PATENT OFFICE.

CHARLES S. COLE, OF BRIDGEPORT, CONNECTICUT.

CONTROLLING MECHANISM FOR MOTORS.

SPECIFICATION forming part of Letters Patent No. 724,261, dated March 31, 1903.

Application filed June 14, 1900. Renewed February 9, 1903. Serial No. 142,604. (No model.)

*To all whom it may concern:*

Be it known that I, CHARLES S. COLE, a citizen of the United States, residing at Bridgeport, in the county of Fairfield and State of Connecticut, have invented certain new and useful Improvements in Controlling Mechanism for Motors; and I do hereby declare the following to be a full, clear, and exact description of the invention, such as will enable others skilled in the art to which it appertains to make and use the same.

My present invention relates to controlling mechanism for motors and comprehends a development of that type of motors designed particularly for use in connection with locomobiles and described and illustrated in my concurrent application for Letters Patent Serial No. 5,585.

This motor is of the multiple-cylinder type and is organized and arranged with special reference to its embodiment in a rigid organization with the generator.

In devising propelling apparatus for locomobiles and similar vehicles it is necessary to group the operative parts in a compact durable structure and to provide for the generation of maximum power and, further, to provide for the absolute control of the mechanism by means of a controlling device so simple in construction and operation as to render the vehicle capable of being handled by a person not skilled in mechanics and having no expert knowledge of the construction and operation of the motor.

In my concurrent application Serial No. 5,585, before referred to, I have described a motor comprehending a casing and a series of radially-disposed cylinders mounted in the casing and within which reciprocate a series of pistons connected to and operating a series of hollow piston-rods connected to and in communication with a hollow shaft common to the several piston-rods and serving as a conduit through which the steam or other motive agent passes to the interiors of the several piston-rods and finally escapes, when permitted by the operation of valve mechanism, through the pistons and into the cylinders. Each piston is provided with a port, through which the live steam passes from the piston-rod under certain conditions and through which the exhaust-steam passes in the reverse direction under certain other conditions. Inasmuch as the direction of rotation of the driving-shaft depends upon the angular position of the piston-rod with respect to the axis of the connected piston, the port through the latter is arranged to one side of its axis in order that when the hollow piston-rod is presented before the port to supply steam to the cylinder the piston-rod will have the proper inclination to drive the shaft in the desired direction. It will therefore appear obvious that in order to reverse the direction of rotation of the shaft under the impulse of any given piston it is simply necessary to shift the piston in order to position the piston-port diametrically opposite its first position, the result of which is to admit steam into the cylinder when the piston-rod is inclined at the opposite side of the axis of the piston, it being understood that the axis of each piston intersects the axis of the driving-shaft and that as a consequence the wrist, to which a given piston-rod is connected, will be located in diametrically-opposed relation to the shaft corresponding to the opposite inclinations of the piston-rod. In the construction illustrated in the application referred to the piston is connected to the piston-rod in a manner to permit its independent rotation for the purpose of effecting the reversal of the position of the piston-port, and this movement is imparted to each piston by a reversing-ring located upon the exterior of the motor-casing and provided with a series of racks, each of which is in constant mesh with a pinion mounted upon the end of a short stem extending into the cylinder and engaging the piston. The rack is designed to be rotated by a controlling-lever to effect the axial reversal of the pistons for the purpose of reversing the direction of rotation of the shaft in the manner heretofore described. I have found, however, that there are some objections to the independent axial movement of the pistons within the cylinders, and it is also undesirable to have the exposed reversing-pinions, as they must of necessity move with the pistons, and any obstruction which might be opposed to their movement would consequently effect the derangement of the motor.

The object of my present invention, therefore, is to obviate the necessity for reversing the pistons and to eliminate the exposed operative parts.

A further object of the invention is to effect these results by the employment of mechanism which renders the entire apparatus capable of being absolutely controlled through the manipulation of what may therefore be termed a "universal controlling device," which may be in the form of a lever or other power-transmitter located in proximity to the operator's seat and within easy reach of the operator.

A still further object of the invention is to provide for the automatic draining of the several cylinders whenever the steam is cut off from the cylinders by the manipulation of the controlling mechanism, and the particular manner in which I accomplish this result contemplates a structure the action of which constitutes, in effect, a retarding device or brake yieldingly opposing continued movement of the motor after the cut-off has been effected in order that the impetus of the vehicle may be quickly overcome and without such suddenness as would result in damage to the apparatus or danger to the occupants of the vehicle.

To the accomplishment of these several ends my present invention consists in providing each piston with diametrically-opposed ports arranged for presentation to the hollow piston-rod in its opposite angular positions, in providing what may be termed a "universal controlling member or plate" rotatably carried by each piston and designed to be rotated to close either or both of the piston-ports by means of a pinion located outside of the casing and operatively connected with the controlling-plate and movable to the extent of the piston-stroke within a supplemental cylinder or cylindrical casing which protects the pinion in its movement and which is designed to be given a partial rotation by suitable mechanism—as, for instance, a reversing-ring—to effect the axial movement of the controlling-plate for the purpose of opening either of the piston-ports to effect the forward propulsion or reversal of the motor or to close both ports for the purpose of effectually cutting off the supply of steam or other motive agent.

The invention further consists in the provision of petcocks adjacent to the outer ends of the cylinders and designed to be automatically opened to drain the cylinders when the controlling mechanism is operated to cut off or shut down the motor.

In the accompanying drawings, wherein I have illustrated an embodiment of my invention, Figure 1 is a sectional view of a motor equipped with my controlling mechanism. Fig. 2 is a similar view showing the motor reversed. Fig. 3 is a sectional view, on an enlarged scale, of one of the cylinders, its piston, and controlling mechanism. Fig. 4 is a fragmentary elevation looking toward the head of one of the cylinders, illustrating an arrangement of one of the petcocks and its actuating mechanism. Fig. 5 is a sectional view on the line 5 5 of Fig. 3. Fig. 6 is a similar view on the line 6 6 of Fig. 3. Fig. 7 is an end view of one of the pistons with the controlling-plate in place, various positions of the latter being shown in dotted lines. Fig. 8 is an end elevation of the piston with the plate removed. Fig. 9 is a detail view of the under face of one of the plates. Fig. 10 is a sectional view through a piston and a portion of its rod, the line of section being at right angles to the line of section through similar parts in Fig. 3; and Fig. 11 is a section on line 11 of Fig. 9.

Referring to the numerals of reference, indicating corresponding parts in the several views, 1 indicates a cylindrical casing pierced axially by a shaft 2, which is hollow and is provided with a hollow wrist connected to and communicating with a radial series of hollow piston-rods 3. The construction of the connection between the rods and wrist constitutes no part of my invention, it being simply necessary to state that this connection is such that the communication between the interiors of the rods and wrist is constant. Each of the hollow piston-rods 3 is provided at its outer end with an enlarged, preferably spherical, head 4, integral with or otherwise fixed to the rod and provided with a diametrical port 5, constituting a continuation of the bore of the contiguous piston-rod. Each of the heads 4 is mounted within a semispherical or other correspondingly-shaped socket 6 in the inner face of a piston 7, designed to reciprocate within one of a series of radial cylinders 8, formed in the casing in any suitable manner and having its inner end open and its outer end closed by a removable head 9, screwed or otherwise secured in the end of the cylinder. The construction of each cylinder and the adjacent parts operatively connected to each piston and rod is identical, and I shall therefore describe in detail one aggroupment of these elements employed in triplicate in the present device and shall then refer to such structure as might not be identified as an element of such group.

The piston 7 is provided with a pair of ports 10 and 11 parallel with but at diametrically opposite sides of its axis and spaced with a suitable interval to effect the presentation of one of the ports to the diametrical port 5 through the head 6 when the piston-rod is at the limit of its lateral movement in either direction. The head 6 is provided, in addition to the diametrical port 5, with a pair of exhaust-ports 12 and 13 at diametrically opposite sides of the port 5 and separated therefrom by such intervals as will present the intervening portions 14 and 15 of the face of the head to the ports 10 and 11 when the piston-rod is in its center position, or, in other words, when it is on a dead-center at either limit of the piston-stroke. The several ports 5, 10, 11, 12, and 13 are located in the line of oscillation of the head 4, so that as the piston-rod is oscillated the ports in the head will be alternately presented before the ports of the piston. The ports 12 and 13 may extend through the head 4 and open into the piston at the lower end of the head, or, if desired, the head may be hollow, as shown, and in this event auxiliary exhaust-ports 16 and 17 are provided in the wall of the head 4 adjacent to its connection with the piston-rod for the purpose of permitting the escape of the exhaust to the interior of the engine-casing in a manner hereinafter to be explained. The piston-ports 10 and 11 are controlled by what I have chosen to term a "universal" controlling-plate, which is, in effect, a valve. This plate (designated by the numeral 18) is preferably, though not necessarily, circular in form and is revolubly mounted coaxially upon the outer end face of the piston 7 and is retained in any suitable manner. A simple form of plate-retaining mechanism, however, is shown in the accompanying drawings and comprehends a plate-retaining ring 19, secured to the piston by screws 20 and having its inner edge overlapping the plate 18 to retain the latter in close contact with the face of the piston without interfering with its movement thereon. Suitable means for limiting the rotation of the plate is preferably provided, and it consists of a stop-lug 21, cast eccentrically upon the under face of the plate and moving within an arcuate recess 22, provided for its reception in the face of the piston.

23 indicates an aperture or port piercing the plate 18 eccentrically and designed by the rotation of the latter to be presented before either of the ports 10 or 11 or to be moved out of apposition thereto for the purpose of establishing communication with the interior of the cylinder through either of the ports or for effecting the closure of both of said ports to entirely cut off the supply of steam to the cylinder. It may be noted at this point, however, that the effective area of either of the ports 10 and 11 may be increased or diminished, as the port through the plate is more or less directly centered thereover in order to provide a cut-off when it is desired to utilize the steam expansively for a portion of the forward stroke.

Before proceeding with a description of the means which I employ for effecting the rotation of the controlling-plate 18 it may be well to refer briefly to the manner in which the ports are utilized to effect the supply and exhaust of the steam from the interior of the hollow piston-rod to the cylinder. Supposing, therefore, that the controlling-plate has been shifted to bring the plate-port 23 into apposition to the piston-port 10, it will be seen that the oscillation of the piston-rod to the extreme limit of its lateral movement, as shown in Fig. 1 of the drawings, will effect the presentation of the port 5 before the port 10 and will permit the escape of steam through the ports 10 and 23 to the interior of the cylinder beyond the piston. The piston, which is now at the extreme outer limit of its stroke, will be urged inwardly, causing the inner end of the piston-rod connected to the wrist to travel in an arcuate path toward a dead-center. This movement of the rod necessarily effects its oscillation from an axis located at the center of the head 4 and causes the disalinement of the ports 5 and 10. In this position of the parts—that is to say, with the piston at the inner limit of its stroke and with the piston-rod in alinement with the axis of the piston—the port 10 will be closed by the face-section 15 of the head 4, but the contiguous end of the exhaust-port 12 will be at or adjacent to the edge of the port 10. Continued movement of the wrist under the impulse of the other pistons, as is well understood in the art, will now oscillate the piston-rod in the same direction, and its lower end will travel toward the opposite limit of its lateral movement, thus presenting the exhaust-port 12 before the port 10 to effect the exhaust of the steam from the cylinder during the outward movement of the piston. The exhaust passes, as will be noted, from the cylinder through the ports 23, 10, and 12 into the interior of the head 4, from whence it escapes through either of the auxiliary exhaust-ports 16 or 17. When the piston has reached the outer limit of its stroke, the port 5 will have been again presented before the port 10, and the operation just described will be repeated. If now it is desired to reverse the engine, the plate 18 is rotated sufficiently to bring the plate-port 23 into apposition with the piston-port 11 and to close the port 10. This shifting of the effective piston-port to the opposite side of the axis of the piston will cause the cylinder to take steam when the piston-rod is at the opposite limit of its lateral movement from that in which it delivered steam to the cylinder through the port 10, and as a result the direction of rotation of the wrist will be reversed. In like manner when it is desired to completely shut off the steam to stop the motor the plate is swung around until the stop-lug 21 is in an intermediate position in the recess 22, in which position the plate-port 23 will be out of effective proximity to both of the piston-ports and will effectually lock the motor against the further ingress of steam to its cylinders.

In Figs. 1, 2, 3, and 4 I have illustrated a preferred embodiment of mechanism for effecting the desired movement of the several controlling-plates through the manipulation of a lever or other device located in proximity to the operator. This mechanism is identical with relation to each plate and consists of a rotary plate-stem 24, connected coaxially to the plate 18 and extending through an axial opening 25 in the piston-head 9, which latter is preferably provided with a stuffing-box 26 to prevent leakage around the stem. At its outer extremity the stem is provided with a disk 27, provided with radial lugs 28, designed to move in internal longitudinal recesses 28×, formed in an auxiliary casing or cylinder 29 and of a length corresponding at least to the piston-stroke and rotatably mounted in ball-bearings 30, interposed between a terminal annular flange 31, formed at the inner end of the casing, and a bearing-flange 32, bolted or otherwise secured upon the face of the stuffing-box 26 and embracing the flange 31 of the casing. The outer end of the casing 29 may be, and preferably is, closed by a disk 33, for the purpose of excluding dust and moisture. As the piston reciprocates, the disk 27 upon the stem is given a like reciprocatory movement within the casing 29 and is retained against rotary movement therein by means of the guide-lugs 28.

In order to effect the synchronous rotation of the several auxiliary cylinders, I prefer to employ a reversing-ring 34, encircling the engine-casing and provided at intervals with reversing-racks 35, one of which meshes with a segmental series of teeth 36, formed upon the exterior of each of the auxiliary cylinders or casings 29. The desired rotation of the reversing-ring 34 to effect the desired rotary movement of the several casings for the purpose of shifting the controlling-plates is effected from the operator's seat by means of a controlling-lever or like device and suitable intermediate connections, which need not be described in detail, as they constitute no part of my present invention.

Any suitable means for preventing such movement of the head 4 as would effect the derangement of the ports may be provided—as, for instance, the diametrically opposite fulcrum-lugs 37, extending from the head and engaging recesses 38 in the interior face of the piston-socket, these recesses being preferably slightly elongated to provide for proper adjustment of the head within the piston to compensate for wear.

The mechanism thus far described is complete and operative; but, as premised, it is necessary to provide means for clearing the cylinders both of steam and condensation whenever the engine is shut down, as it is obvious that the rotation of the controlling-plates to cut off the steam will also cut off the exhaust, and it is highly desirable to accomplish this relief in a manner which will oppose more or less resistance to the further operation of the engine under the impetus gained. This is particularly true when the motor is used in connection with automatic safety apparatus, which effects a cut-off of the steam or other motive agent in an emergency, because it is essential that the progress of the vehicle be checked and without such shock as might result from the sudden application of an emergency brake. I therefore tap each of the cylinders adjacent to its outer end and insert the nipple of a petcock 39 having its plug-handle 40 hollowed out and fitted with an adjustable actuating-arm 41, adjustably secured within the handle 40, as, for instance, by a set-screw 42. The arm 41 extends upwardly outside of the casing and beyond its periphery and is provided at its extremity with a right-angular stud 43, engaged by a bifurcated lug 44, cast upon the under side of the reversing-ring 34, preferably immediately behind the adjacent reversing-rack. It will now be seen that the plugs of the several petcocks may be set in a manner to effect the opening of the cocks whenever the reversing-ring is moved sufficiently to cut off the steam and lock the motor. Therefore when the motor-vehicle is running at high speed the operation of the automatic cut-off will simultaneously close the piston-ports and open the petcocks. The result of this will be to oppose the outward movement of the pistons by the confined heads of steam, which, however, will be gradually cleared from the cylinders, together with condensation, through the comparatively small openings through the several cocks.

In Fig. 2 of the drawings I have illustrated a modification of my invention, which comprehends the mounting of the cylinders rotatably in the casing and geared directly to the reversing-ring, the piston in this case being retained against rotation within the cylinder by suitable means, which causes the position of the single piston-port to be reversed when the reversing-ring is actuated to rotate the cylinder.

From the foregoing it will be seen that I have developed a novel construction of motor, or, more properly, of its controlling mechanism, which will effectually attain the several objects hereinbefore fully defined; but while the present embodiment of the invention appears at this time to be preferable I desire to be distinctly understood as reserving to myself the right to effect such variations of construction and arrangement as may be properly comprehended within the scope of the claims.

What I claim is—

1. A motor comprising a cylinder and piston, and a separate rotary controller located within the cylinder and associated with the piston, said controller comprising reversing means.

2. A motor comprising a cylinder and piston, a separate rotary controller located within the cylinder, and exterior adjusting means for said controller.

3. A motor comprising a cylinder and piston, and a rotary controlling member carried by the piston and comprising reversing means.

4. A motor comprising a cylinder and piston, controlling mechanism carried by the piston and including a rotary element, and means exterior to the cylinder for adjusting said rotary element.

5. A motor comprising a cylinder, a ported piston, an oscillatory piston-rod, and mechanism located within the cylinder for admitting the motive agent through the piston in different positions of the piston-rod to effect the reversal of the motor.

6. A motor comprising a cylinder, a piston, an oscillatory piston-rod, controlling mechanism carried by the piston and comprising reversing means, and means exterior to the cylinder for adjusting the controlling mechanism to a set position.

7. A motor comprising a cylinder, a ported piston, a separate rotatable controller-plate controlling the piston-ports, and means exterior to the cylinder for adjusting the position of said plate.

8. A motor comprising a cylinder, a piston provided with a plurality of ports, a ported plate rotatably mounted upon the piston, and means exterior to the cylinder for adjusting the position of said plate.

9. A motor comprising a cylinder, a piston provided with a plurality of ports, an oscillatory hollow piston-rod having a live-steam port and also a pair of exhaust-ports all of which coöperate with the ports of the piston, and means for introducing steam through the hollow rod.

10. A motor comprising a cylinder, a piston provided with a plurality of ports, an oscillatory hollow piston-rod, controlling means within the cylinder, and means for actuating said controlling means.

11. A motor comprising a cylinder, a piston provided with a plurality of ports, a hollow oscillatory piston-rod, a controlling-plate carried by the piston, and means for actuating the plate.

12. A motor comprising a cylinder, a piston provided with a plurality of ports, an oscillatory hollow piston-rod, a ported controlling-plate carried by the piston, and means exterior to the cylinder for actuating the plate.

13. A motor comprising a cylinder, a piston provided with a plurality of ports, a rotary ported plate carried by the piston, and means exterior to the cylinder for rotating the plate.

14. A motor comprising a cylinder, a piston provided with a plurality of ports, a ported rotary plate mounted on the piston, and a plate-stem connected to the plate and passed through the head of the cylinder.

15. A motor comprising a plurality of cylinders and ported pistons, a separate controlling device carried by each piston, and an actuator common to all of the controlling devices and comprising means for synchronously adjusting the same.

16. The combination with a motor-cylinder and a rotary controlling member therein, of a stem extending from said member, a casing receiving the stem and permitting independent movement of the stem in one path.

17. The combination with a cylinder and a rotary controlling member therein, of a rotary casing, and a stem extending into the casing from the member.

18. The combination with a motor-cylinder and a rotary controlling member therein, of a stem extending from said member, a rotary casing receiving said stem, and means for rotating the casing.

19. The combination with a cylinder and a controlling member therein, of a cock for clearing the cylinder, and common actuating means for the cock and controlling member.

20. The combination with a cylinder and a rotary controlling member therein, of a cock for clearing the cylinder, and actuating means common to the cock and controlling member.

In testimony whereof I affix my signature in presence of two witnesses.

CHARLES S. COLE.

Witnesses:
CHAS. H. SHANNON,
WILLIAM LOUNSBURY.